United States Patent
Wurth

(10) Patent No.: US 10,382,313 B2
(45) Date of Patent: Aug. 13, 2019

(54) TEST BUILDING FOR TESTING SERVER OPERATION

(71) Applicant: INTERNATIONAL BUSINESS MACHINES CORPORATION, Armonk, NY (US)

(72) Inventor: Emmanuel Wurth, Muret (FR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 239 days.

(21) Appl. No.: 15/434,141

(22) Filed: Feb. 16, 2017

(65) Prior Publication Data

US 2018/0234329 A1    Aug. 16, 2018

(51) Int. Cl.
*G06F 15/16* (2006.01)
*H04L 12/26* (2006.01)
(Continued)

(52) U.S. Cl.
CPC .......... *H04L 43/50* (2013.01); *G06F 11/3672* (2013.01); *H04L 67/02* (2013.01); *H04L 67/42* (2013.01)

(58) Field of Classification Search
CPC ................ H04L 43/50; H04L 67/02
(Continued)

(56) References Cited

U.S. PATENT DOCUMENTS 6,697,964 B1 * 2/2004 Dodrill ............... G06F 11/3414
                                                          709/200
7,047,277 B1 * 5/2006 Welter ..................... H04L 43/50
                                                          709/203
(Continued)

FOREIGN PATENT DOCUMENTS

WO    2015004276 A2    1/2015

OTHER PUBLICATIONS

"Announcing Support for HTTP/2 Server Push", [retrieved on Oct. 22, 2016]. Retrieved from the Internet:< URL: https://blog.cloudflare.com/announcing-support-for-http-2-server-push-2/ >, Apr. 28, 2016, 7 pgs.

(Continued)

*Primary Examiner* — Karen C Tang
(74) *Attorney, Agent, or Firm* — Steven Chiu; Matthew M. Hulihan; Heslin Rothenberg Farley & Mesiti PC

(57) ABSTRACT

A method obtains a specification of a first test, which includes a set of requests for testing server operation according to a first protocol, and builds a specification of a second test, which includes requests and corresponding expected server responses for testing server operation according to a second protocol. Building the specification of the second test includes selecting and processing a request of the set of requests. Processing the selected request includes identifying, based on an expected response to the selected request, dependencies of the expected response, which are resources indicated by the expected response or dependencies of those resources, that are requested in related additional request(s) of the first test. The process adds, to the specification of the second test, the selected request, and indicates the expected response and the identified dependences as being a corresponding expected server response from a server operating according to the second protocol.

20 Claims, 10 Drawing Sheets

(51) Int. Cl.
*H04L 29/08* (2006.01)
*G06F 11/36* (2006.01)
*H04L 29/06* (2006.01)

(58) Field of Classification Search
USPC .................................................. 709/231
See application file for complete search history.

(56) References Cited

U.S. PATENT DOCUMENTS

| | | | | |
|---|---|---|---|---|
| 8,856,211 | B1* | 10/2014 | Kassamali | H04L 11/3672 |
| | | | | 717/203 |
| 8,904,353 | B1* | 12/2014 | Arguelles | G06F 11/3672 |
| | | | | 717/124 |
| 9,178,903 | B1* | 11/2015 | Kaplan | H04L 63/1433 |
| 9,203,931 | B1* | 12/2015 | Ngo | H04L 67/28 |
| 2003/0229884 | A1* | 12/2003 | Carr | G06F 17/30306 |
| | | | | 717/101 |
| 2006/0010157 | A1* | 1/2006 | Dumitrascu | G06F 8/31 |
| 2008/0300834 | A1* | 12/2008 | Wiemer | G06F 17/504 |
| | | | | 703/2 |
| 2009/0210528 | A1* | 8/2009 | Swildens | H04L 12/14 |
| | | | | 709/224 |
| 2010/0077072 | A1* | 3/2010 | Guruswamy | H04L 43/50 |
| | | | | 709/224 |
| 2011/0022899 | A1* | 1/2011 | Greenberg | G06F 11/3414 |
| | | | | 714/32 |
| 2012/0084407 | A1* | 4/2012 | Soulios | G06F 17/30306 |
| | | | | 709/220 |
| 2012/0297367 | A1* | 11/2012 | Mujeeb | G06F 11/3688 |
| | | | | 717/125 |
| 2012/0330182 | A1* | 12/2012 | Alberts | G09B 23/28 |
| | | | | 600/558 |
| 2013/0055026 | A1* | 2/2013 | Hatano | G06F 11/263 |
| | | | | 714/32 |
| 2013/0268800 | A1* | 10/2013 | Rangaiah | G06F 11/2033 |
| | | | | 714/4.11 |
| 2014/0006358 | A1* | 1/2014 | Wang | G06F 17/30289 |
| | | | | 707/687 |
| 2014/0279747 | A1* | 9/2014 | Strassner | G06N 99/005 |
| | | | | 706/12 |
| 2014/0325484 | A1* | 10/2014 | Gillaspie | G06F 11/3684 |
| | | | | 717/124 |
| 2015/0039764 | A1* | 2/2015 | Beloglazov | H04L 47/70 |
| | | | | 709/226 |
| 2015/0120259 | A1* | 4/2015 | Klimeck | G06F 17/5009 |
| | | | | 703/2 |
| 2015/0234731 | A1* | 8/2015 | Williams | G06F 11/3684 |
| | | | | 717/126 |
| 2015/0363192 | A1* | 12/2015 | Sturtevant | G06F 8/72 |
| | | | | 717/131 |
| 2016/0055142 | A1* | 2/2016 | Strassner | G06Q 30/0201 |
| | | | | 707/755 |
| 2016/0188609 | A1* | 6/2016 | Strassner | G06F 17/3071 |
| | | | | 707/740 |
| 2016/0210224 | A1* | 7/2016 | Cohen | G06F 9/44589 |
| 2016/0259713 | A1* | 9/2016 | Belur | G06F 11/3676 |
| 2017/0180238 | A1* | 6/2017 | Telle | H04L 43/50 |
| 2017/0353531 | A1* | 12/2017 | Conn | H04L 67/2861 |
| 2018/0060460 | A1* | 3/2018 | Zhang | G06F 17/5009 |
| 2018/0089011 | A1* | 3/2018 | Basiri | G06F 11/0709 |
| 2018/0121258 | A1* | 5/2018 | Subramaniyan | G06F 9/541 |

OTHER PUBLICATIONS

Andrew, Rachel, "Getting Ready for HTTP/2: a Guide for Web Designers and Developers", [retrieved on Oct. 22, 2016]. Retrieved from the Internet: <https://www.smashingmagazine.com/2016/02/getting-ready-for-http2/ >, Feb. 16, 2016, 15 pgs.
"Migrating Large Sites to HTTP/2", [retrieved on Oct. 22, 2016]. Retrieved from the Internet:<https://www.symfony.fi/entry/migrating-large-sites-to-http-2 >, 8 pgs.
Engelen, Arnout, "HTTP/2 Server Push", [retrieved on Feb. 7, 2017]. Retrieved from the Internet<URL: http://blog.xebia.com/http2-server-push/>, Aug. 28, 2015, 5 pgs.
Grigorik, Ilya, "Innovating with HTTP 2.0 Server Push", [retrieved on Feb. 7, 2017]. Retrieved from the Internet: <URL: https://www.igvita.com/2013/06/12/innovating-with-http-2.0-server-push/>, Jun. 12, 2013, 4 pgs.
"Configuring HTTP/2 Push", [retrieved on Feb. 7, 2017]. Retrieved from the Internet<URL: http://www.eclipse.org/jetty/documentation/9.4.x/http2-configuring-push.html>, 1 pg.
Mell, Peter, et al., "The NIST Definition of Cloud Computing", NIST Special Publication 800-145, Sep. 2011, Gaithersburg, MD, 7 pgs.

* cited by examiner

TEST BUILDING FOR TESTING SERVER OPERATION

BACKGROUND

Operations of a hosting server are often tested to ensure that the server behaves properly and according to the particular protocol for which it is designed. The testing will test performance and functions using any of a variety of available tools. In the context of a Hypertext Transfer Protocol (HTTP) server, the server can operate according any of several different HTTP protocol specifications, for instance the HTTP 1.1 protocol specification or the HTTP 2.0 protocol specification, among others. An HTTP/1.1 server test typically includes sending a sequence of HTTP requests to the server and comparing expected returned values to the actual responses received from the server in response to the requests. Unfortunately, runtime behavior of a server operating according to one protocol, such as HTTP/1.1, may be very different from runtime behavior of a server operating according to another protocol, such as HTTP/2.0. This can render a test specification for the one server largely inadequate for testing the other server.

SUMMARY

Shortcomings of the prior art are overcome and additional advantages are provided through the provision of a computer-implemented method. The method obtains a specification of a first test. The specification of the first test includes a set of requests for testing server operation according to a first protocol. The method also builds a specification of a second test. The specification of the second test includes requests and corresponding expected server responses for testing server operation according to a second protocol. Building the specification of the second test includes selecting and processing a request of the set of requests of the first test. This processing of the selected request includes identifying, based on an expected response in response to the selected request, dependencies of the expected response. The dependencies are resources indicated by the expected response or dependencies of those resources, that are requested in one or more related additional requests of the set of requests of the first test. The processing of the selected request also includes adding, to the specification of the second test, the selected request, and indicating the expected response and the identified dependences as being a corresponding expected server response, in response to the selected request, from a server operating according to the second protocol.

Further, a computer system is provided that includes a memory and a processor in communications with the memory, wherein the computer system is configured to perform a method. The method obtains a specification of a first test. The specification of the first test includes a set of requests for testing server operation according to a first protocol. The method also builds a specification of a second test. The specification of the second test includes requests and corresponding expected server responses for testing server operation according to a second protocol. Building the specification of the second test includes selecting and processing a request of the set of requests of the first test. This processing of the selected request includes identifying, based on an expected response in response to the selected request, dependencies of the expected response. The dependencies are resources indicated by the expected response or dependencies of those resources, that are requested in one or more related additional requests of the set of requests of the first test. The processing of the selected request also includes adding, to the specification of the second test, the selected request, and indicating the expected response and the identified dependences as being a corresponding expected server response, in response to the selected request, from a server operating according to the second protocol.

Yet further, a computer program product including a computer readable storage medium readable by a processor and storing instructions for execution by the processor is provided for performing a method. The method obtains a specification of a first test. The specification of the first test includes a set of requests for testing server operation according to a first protocol. The method also builds a specification of a second test. The specification of the second test includes requests and corresponding expected server responses for testing server operation according to a second protocol. Building the specification of the second test includes selecting and processing a request of the set of requests of the first test. This processing of the selected request includes identifying, based on an expected response in response to the selected request, dependencies of the expected response. The dependencies are resources indicated by the expected response or dependencies of those resources, that are requested in one or more related additional requests of the set of requests of the first test. The processing of the selected request also includes adding, to the specification of the second test, the selected request, and indicating the expected response and the identified dependences as being a corresponding expected server response, in response to the selected request, from a server operating according to the second protocol.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The issue of incompatibility of one test specification, having requests for testing server operation according to one protocol, for use in testing server operation according to another protocol may present itself when migrating from an HTTP/1.1 infrastructure to an HTTP/2 infrastructure. The migration is largely a transparent operation that does not affect the structure of the site. However, as noted, the run time behavior of the exchanges between a client and the server is dramatically different when comparing HTTP/1.1 operation to HTTP/2.0 operation. Therefore, the manner in which to test the HTTP 2.0 site is different and governed by the HTTP/2 behavior. Existing HTTP/1.1 tests are unusable and as a result an administrator has to construct new tests to check the equivalent HTTP/2.0 functionality.

Figure 1:
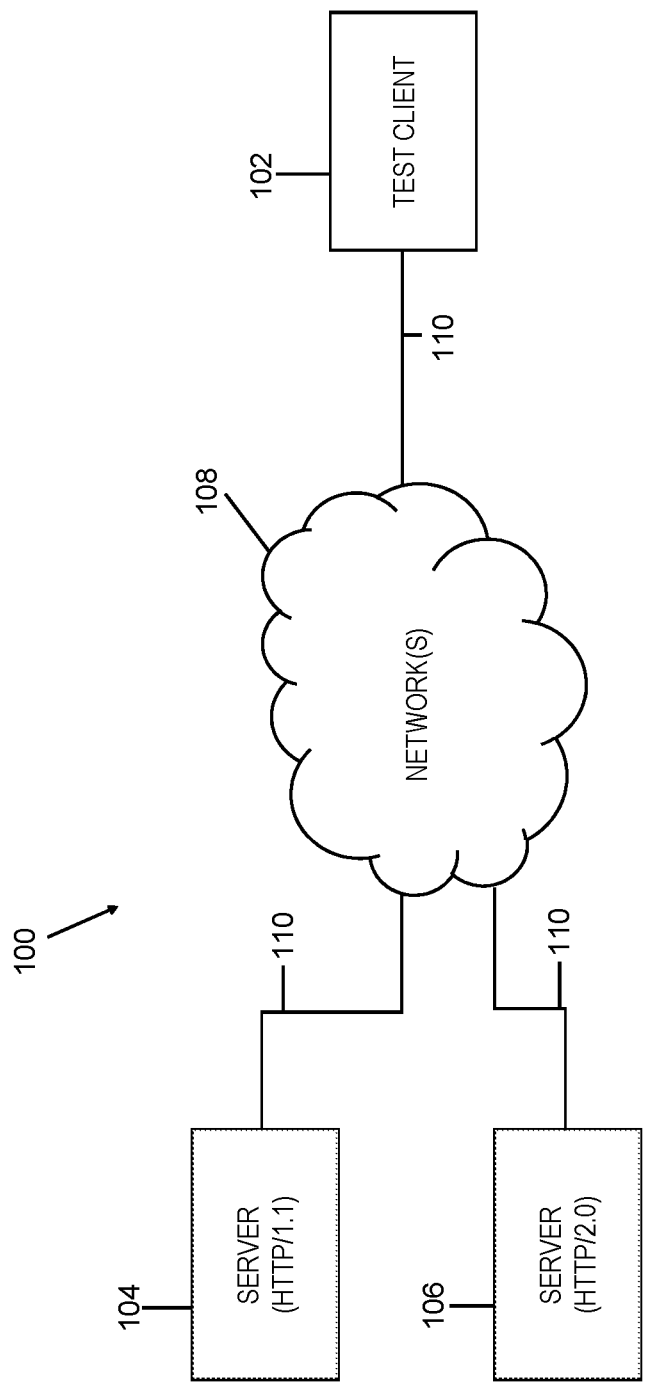
FIG. 1 depicts an example environment to incorporate and/or use aspects described herein.

FIG. 1 depicts an example environment 100 to incorporate and/or use aspects described herein, such as an environment in which a test client 102 can test HTTP server(s), such as a server 104 operating according to the HTTP/1.1 protocol specification and a server 106 operating according to the HTTP/2.0 protocol specification. The test client 102 is or includes a computer system that issues client requests to server 104/106 across intervening network(s) 108, which may include one or more wide area network(s), such as the internet, and/or one or more local area networks, as examples. Client 102 and servers 104 and 106 are in communication with network(s) 108 via wired or wireless communications links 110. More generally, communications links 110 may be any appropriate wireless or wired communication link(s) for communicating data.

Servers 104 and 106 are computer systems that host website(s) and/or other web resources transferred via HTTP. In a typical test scenario, test client 102 issues requests to a server, receives responses, and compares those response(s) that it receives to response(s) it expects to receive. The comparison will inform how well the server performs according to the expected HTTP protocol.

It may be desired to migrate an existing HTTP site from an HTTP1.1 server infrastructure to an HTTP/2 infrastructure. In the example of FIG. 1, it may be desired to migrate site hosting duties from server 104 to server 106, for instance. Though in this example the source and target servers are different computer systems, in other examples the migration occurs on the same server, in which the server itself is upgraded/migrated to operate according to the HTTP/2.0 protocol.

HTTP/1.x exchanges differ from HTTP/2.0 exchanges. An HTTP/1.0 session may include sequential requests/responses where the client sends a request, the server responds with a response, the client then sends the next request, and so on. HTTP/1.1 allows for pipelined exchanges, where multiple client requests can be outstanding and the server responds to requests in the same sequence that the requests were issued by the client. HTTP/2 supports interleaved exchanges where, for first and second client requests issued in that order, the server responds to the second client request before responding to the first client request which was issued before the second client request. HTTP/2 also supports push behavior where, based on a client request, the server pushes not only the resource(s) requested by that request but additional resources that the client would ordinarily (e.g. under HTTP/1.x specification) issue subsequent request(s) to retrieve.

As an example, in the HTTP/1.1 exchange, the client would parse the initial content delivered as a response to an initial client request for an HTTP page in order to create additional HTTP requests to download what is required to execute/render the requested HTTP page. Example additional items that would normally be requested by subsequent client request(s) include icons or other pictures, cascading style sheets (css files), xsl style sheets, js objects, and so on. In contrast, the HTTP/2 server-push feature, appropriately configured, would allow the server to send a collection of appropriate resources in response to the initial client request. The pushed content is made available anticipatorily for use by the client browser when it may have otherwise produced request(s) to obtain the content. This induces a reduction in the time required to render the HTTP page (i.e. display all the pictures, ready to run javascripts, with the style sheet applied to .xml content, etc.)

Consequently, a test based on the HTTP/1.x specification would not adequately test a server operating according to HTTP/2.0 because the expected operating behavior of both servers differs dramatically. Described herein are approaches to address the problem of unusable HTTP tests against an HTTP/2 server, wherein HTTP/1.1 tests (as examples) are converted into well-formed HTTP/2 tests that adequately test whether, for each tested call hosted by the server, at least the discovered, related static resources are pushed to the client by way of the server operation.

Accordingly, facilities described herein can automatically migrate a test specification for testing operation of a server operating to a first protocol, for instance HTTP/1.1, to a test specification for testing operation of a server operating to a second protocol, for instance HTTP/2.0. A method analyzes an existing test so that the structure of the tested HTTP site can be determined and reused to create HTTP/2 push-compliant tests. The method determines what will (or should) be pushed by the HTTP/2 server, and the result is built into the new test. For complex case like javascript methods, dataflow & control flow analysis applied on the HTTP site could facilitate the aspects described herein so that Representational State Transfer (REST) calls that use dynamic variables, which could be pushed, like for static resources, can be discovered.

In a particular example, a set of graphs of static dependencies may be determined, reflecting the relation: (Node (HTTP page)) depends on (Node on the same server (resource: .ico, picture, css, xsl, . . . )). Then, it is possible to convert tests in the initial (HTTP/1) test specification into HTTP/2 tests using these graphs so that all of the HTTP/1 primary requests are maintained, and all of the secondary requests (those to obtain resources related to those indicated by the response to the primary request) are grouped as answers that should be pushed directly by the HTTP/2 server in response to that primary request.

In some examples, only static dependencies are considered because dynamic calls, such as REST calls with variables extracted at run-time, may not be candidates to push before they are explicitly requested by way of a dedicated request. Additionally or alternatively, the testing may cover only resources residing on the target server because the server may not be able to push dependencies hosted elsewhere, though it is noted that in some examples the testing may test the ability of the server to proactively push those elements or cause them to be pushed to the client, if desired.

Figure 2:
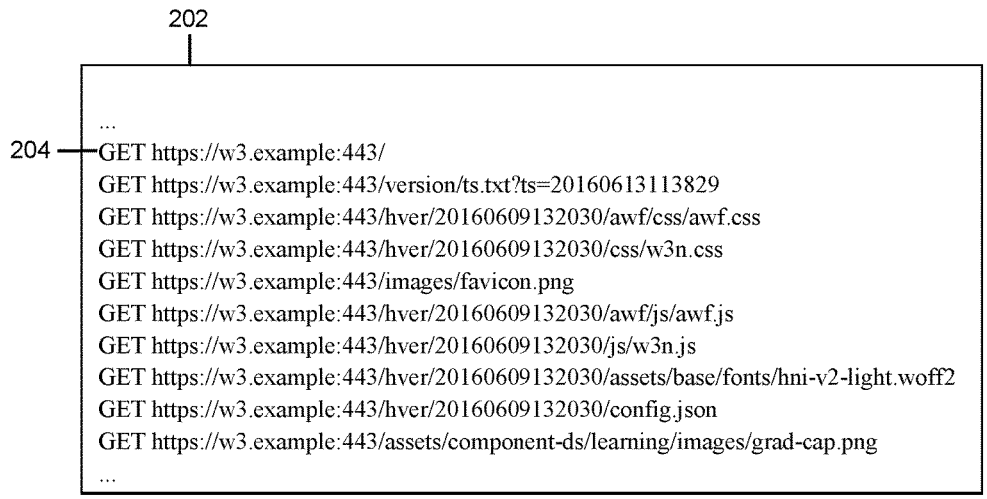
FIG. 2 depicts a portion of an example specification of a first test including requests for testing server operation according to a first protocol.

FIG. 2 depicts a portion of an example specification of a first test including requests for testing server operation according to a first protocol. The specification 202 illustrates the structure of an existing HTTP 1.1 based test, where in this example each line of the test 202 includes an HTTP request or "call" to the server by specifying GET and the Uniform Resource Indicator (URI) to the resource.

Aspects will analyze this first test to build a specification of a second test including requests to test server operation according to the second protocol. Initially, the content/resource indicated by the first request 204 will be analyzed based on a library of tags that reflect the ways to which resources can be explicitly referred in that content. Tags related to the primary sub-resources, i.e. the static dependencies noted therein, to download are located. By way of example, assume that the content indicated by the first request, which is the expected response to that request, is delivered as an index.html page and includes the following HTML code, among other code not shown:

```
xmlhttp.open("GET","version/ts.txt?ts="+timestamp,false);
<link rel="icon" type="image/png" href="images/favicon.png" />
<link rel='stylesheet' href='../'+ cache_buster.hver +'awf/css/awf.css'>
<link rel='stylesheet' href='"+ cache_buster.hver +"css/w3n.css'>
<script src="//www.ibm.com/common/stats/w3_nondojo_eluminate.js" type="text/javascript">//</script>
document.write("<script type='text/javascript' src='../
"+ cache_buster.hver+"awf/js/awf.js'><\/script>");
document.write("<script type='text/javascript' src='"+ cache_buster.hver
+"js/w3n.js'>
```

The tags that will be located from this portion include "link", "href", "script" and "src" in the above—they are examples of the ways by which the existing HTTP frameworks reference resources external to the particular HTML document. These pieces of information refer to external resources, or dependencies, of the content requested. These resources could be any type of resources, examples of which include images (favicon.png) and icons, CSS files, JS files, and any other form of digital content. In the example code above, the following are resources indicated by the excerpt of the index.html file i.e. the expected response to the first request 204: "version/ts.txt?ts=", "images/favicon.png", "awf/css/awf.css", "css/w3n.css", "//www.example.com/common/stats/w3_nondojo_eluminate.js", and "awf/js/awf.js". There may be additional resources indicated in other parts of the expected response index.html file, though these portions of the index.html are not shown.

Then, the method locates the related additional requests in the test that request any of the identified resources. In one example, this is done by a semantic analysis of these pieces of information and by pattern matching applied against the URIs of subsequent call(s) of the test. The URIs are included in separate calls made for those resources. The pieces of information are analyzed to determine whether they refer to known resources types (e.g. .ico, .png, .css, etc.) or to pieces of HTTP REST calls (e.g. /version/ts.txt?ts . . . ); REST calls using dynamic variables may be ignored in some examples since they indicate that run time information is required for them. This is the case in the present example (/version/ts.txt?ts), though static REST-like calls may be preserved. In terms of the pattern matching, the URIs that relate to resources may be searched by scanning the URIs of subsequent HTTP calls with the pattern of the resource name. For instance, the indication "images/favicon.png" in the response HTML file may trigger a search of *images/favicon.png in the URIs of subsequent HTTP calls of the test. Additionally, it may search for the explicit resource name directly if the information is already a well formed URI.

Figure 3:
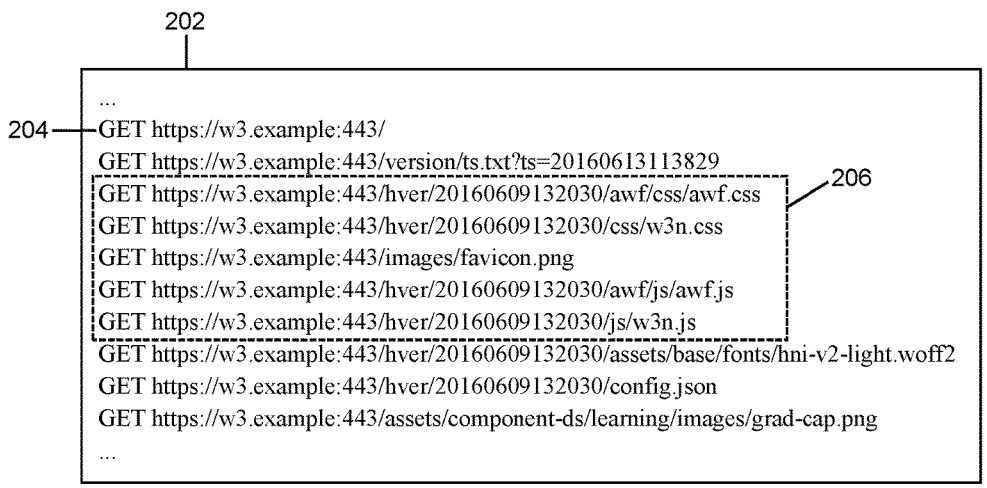
FIGS. 3-4 illustrate the identification of additional requests that are related to an initial request of the first test, in accordance with aspects described herein.
Figure 4:
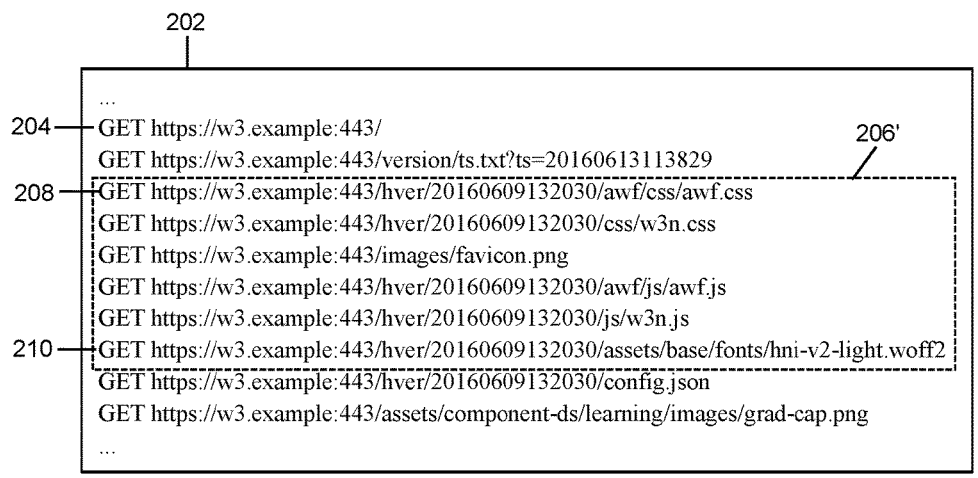

FIGS. 3-4 illustrate the identification of additional requests that are related to initial request 204 of the first test, in accordance with aspects described herein. Referring initially to FIG. 3, the process identifies the requests indicated by 206 as being related additional requests of the test 202. That is, they request resources that are indicated in the HTML response to the request 204. It is noted that since FIG. 3 shows just an excerpt of the test, this identification might identify additional requests not depicted in the excerpt of 202 shown in FIG. 3.

For each of these identified related additional request(s), the process to analyze the content/resource expected in response to such request and to identify subsequent URIs that make the calls for resources indicated in that content repeats. In other words, if a requested resource itself references another resource to be requested by way of an additional request of the test, that additional request will be identified. This repeats for any sub-resource call discovered.

In this manner, the resources indicated in the expected response to request 204 are considered dependencies of that expected response. Those resources themselves may have dependencies. The 'awf/css/awf.css' resource is a dependency of the HTML file requested by 204. The awf.css file may itself make reference to a resource to be downloaded. Such resource is therefore also considered a dependency of the awf.css resource, which is the item expected in response to request 204. For each of the calls in the test that is to retrieve an identified dependency of a server response, the process will perform the same analysis to locate potential sub-dependencies of the resource that is the response, until there are no more dependencies discovered.

Using the example of the "awf/css/awf.css" resource, and referring to FIG. 4, request 204 has an expected response that includes code referencing the awf.css resource, for which there is a corresponding request 208 to download that resource. Assume that the awf.css resource references a font called hni-v2-roman.woff2. The process will analyze that awf.css resource and identify that the font is a dependency for which a separate call 210 is made in the test to download that font. The font is a dependency of the expected response (awf.css) to request 208, and awf.css is itself a dependency of the expected response to request 204 (i.e. index.html), therefore the font is a dependency of index.html.

The process will continue digging into each resource's dependencies to identify all dependencies of the root resource expected in response to the primary request 204. This may be done with specific attention to avoid cyclic dependencies. Additionally, in some embodiments, dependencies that are discovered but are not hosted by the host being tested by the primary request are discarded from consideration.

As a result, for the initial primary call, identifying the dependencies identifies not only the requested resource but a list of sub-resources that are both expected for the site to function properly and that can be pushed by the server being tested when responding to that initial call. In the example of FIG. 4, the items indicated by 206' are the resources that should be pushed by the HTTP/2 infrastructure in response to request 204.

The process then repeats for the next primary HTTP request. It is noted that these requests indicated by 206' are not primary requests because they are called to download dependencies of another requested resource (e.g. response to 204), and those requests were already processed in the sense that their dependencies were ascertained. In FIG. 4, the next primary request is the one sitting between request 204 and requests 206' (assuming it is a static resource). The next primary request after that one would be the request for config.json following requests 206'. Resulting from the above analysis of the set of HTTP/1.1 calls and the building the HTTP/2 test is a set of HTTP/2 calls that will allow the testing of at least the discovered appropriate static resources to be pushed based on receiving those calls.

Figure 5:
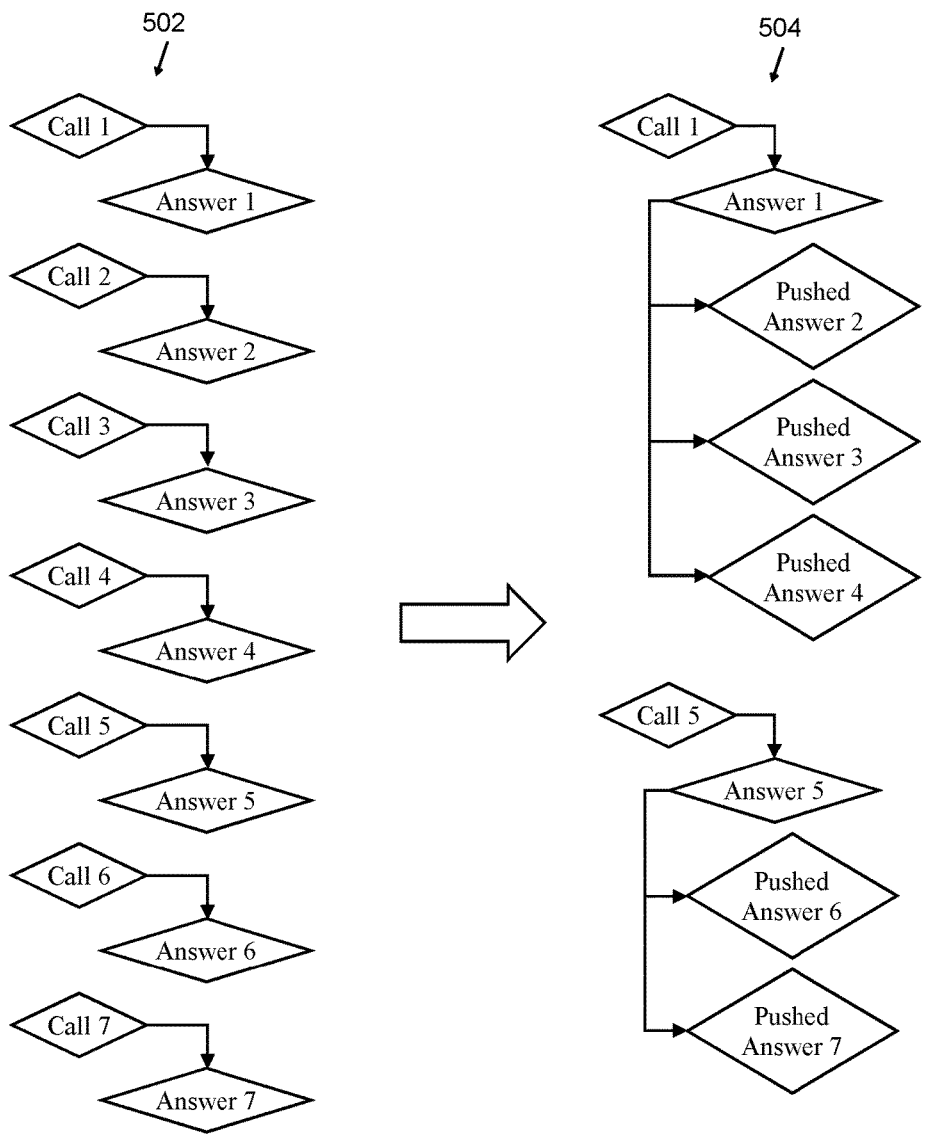
FIG. 5 depicts a conceptual diagram showing migration from HTTP/1.1 exchanges to HTTP/2 exchanges, in accordance with aspects described herein.

FIG. 5 depicts a conceptual diagram showing migration from HTTP/1.1 exchanges to HTTP/2 exchanges, in accordance with aspects described herein. HTTP/1.1 exchanges 502 are shown on the left, where the calls and answers follow a sequence and each call receives an answer corresponding to that call before the client issues the next call. Equivalent HTTP/2.0 exchanges 504 are shown on the right, which represents the structure of the behavior to be tested by an HTTP/2.0 test. The set of HTTP/1.1 calls and the individual responses in exchanges 502 has been processed so that the primary calls (Call 1 and Call 5 in this example) and the resources that are to be pushed in response to those calls are discovered. In this example, Answers 2-4 are all dependencies on Answer 1. The HTTP/1.1 test's Call 1 (with expected response Answer 1), Call 2 (with expected response Answer 2), etc., are turned into a test to test that Call 1 is answered with Answer 1 and pushed Answers 2, 3, and 4 when Call 1 is made, and Call 5, the next primary call, is answered with Answer 5 and pushed Answers 6 and 7.

It is seen that the HTTP/2.2 test will include fewer calls because the intervening calls requesting dependencies in exchange 502 (Calls 2, 3, 4, 6, 7) are eliminated.

Figure 6:
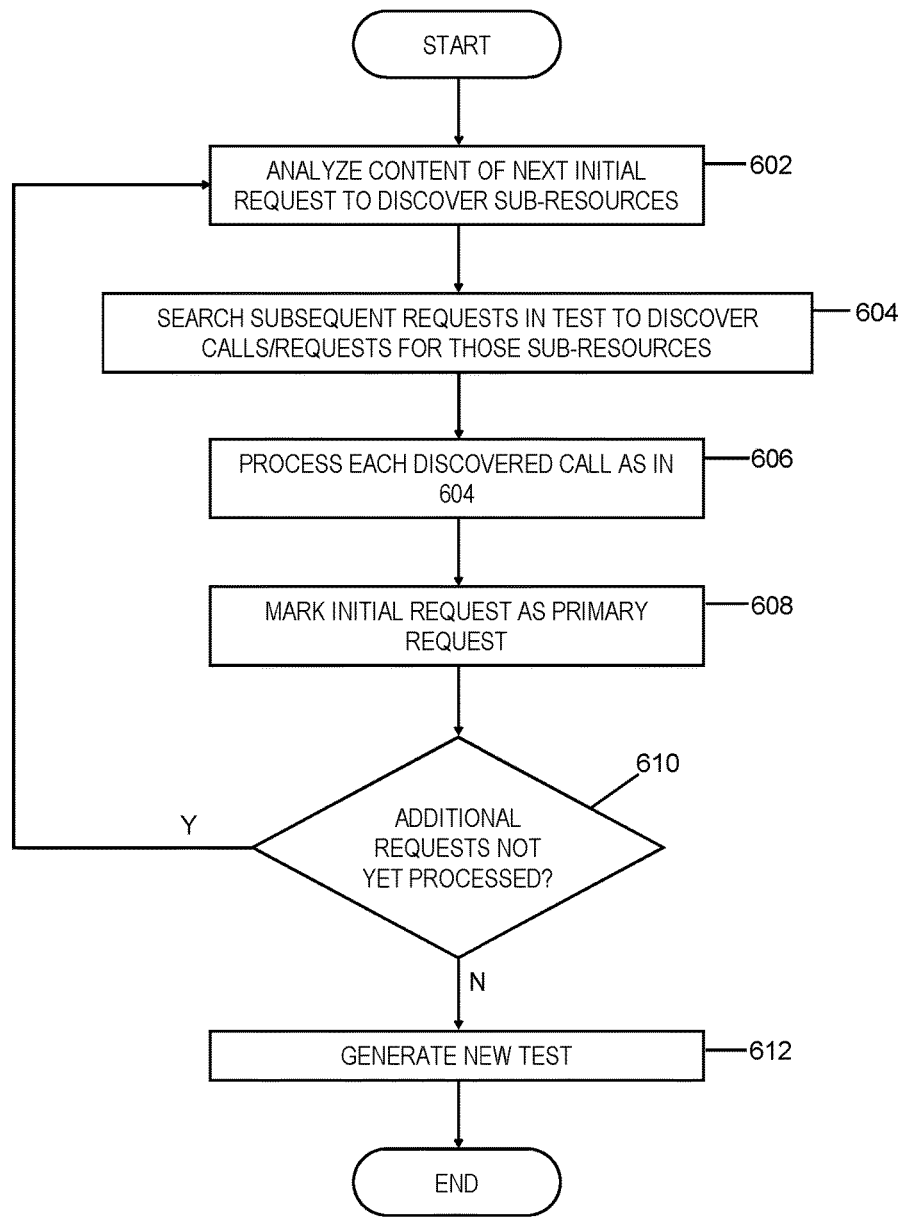
FIG. 6 depicts an example process for converting a first test to a second test for testing server operation, in accordance with aspects described herein.

FIG. 6 depicts an example process for converting a first test to a second test for testing server operation, in accordance with aspects described herein. The process is performed by one or more computer systems. An input to the process may be a set of HTTP/1.1 requests (an existing HTTP/1.1 test for instance).

The process analyzes the input request-by-request so that for each request, a graph of dependencies (HTTP request-→depends on static resources) is created. The process extracts this graph of dependencies by analyzing (602) the content of the initial request by searching for tags that are related to sub-resources. This analysis is done using a library of tag patterns that reflects the technologies in place when performing the testing that work with HTTP technology, e.g. HTML language, javascript language, stylesheet language, etc.

The process then searches (604) for calls for the identified sub-resources in subsequent HTTP requests, e.g. using pattern matching technologies based on the information discovered in 602 against the URLs. REST URLs with parameters extracted at runtime are excluded from this search so that only static resources are discovered. Sub-resources discovered that do not share the same host compared to the one being tested are discarded. The process processes (606) the sub-resources HTTP calls discovered in the previous steps in the same way so that their potential sub-dependencies are discovered too. During this aspect, cyclic dependencies are monitored and such a cyclic dependency discovery can end the process of searching for sub-dependencies of the given sub-resource. This is repeated for all sub-resources until there are no more discovered sub-resources left to process.

The process marks (608) the initial request analyzed in 602 as a primary request that will trigger during the execution the existing HTTP answer and at least the push of all the discovered sub-resources from the server. If there are additional requests not yet processed (610, Y), the process then returns to 602 and repeats, for the next request not already processed (i.e. that does not already reflect the download of an already discovered sub-resource/dependency for to primary request), the sub-resource discovery and the sub-dependencies discovery for all of the discovered sub-resources.

Otherwise (610, N), all of the HTTP/1.1 requests from the input have been processed. Once this occurs, the process generates (612) the HTTP/2 test as a sequence of primary request and indicating the expected answer to that request and the list of associated sub-resources that should be pushed by the server if it is operating properly according to the HTTP/2.0 protocol. In this manner, a test has some way of checking that what was returned in response to a request was correct; usually the expected answer would be included or at least indicated in the test itself.

The output new test of the process is an HTTP/2 test that tests whether the proper resources are being pushed in response to a request. As a result, it is possible to test that the HTTP/2 infrastructure will push the appropriate resources responsive to the appropriate calls, as expected by the design of the HTTP site.

Aspects described herein enable a system to automatically build, from a set of existing HTTP/1.1 requests, HTTP/2 tests that will check that the appropriate static resources are pushed by the server, responsive to an HTTP request. This can include analyzing each of the HTTP/1.1 requests using a library of know tags that express calls to HTTP sub-resources, so that information related to the dependent resources can be extracted. Pattern matching is used to locate the calls to the static dependent resources, and a graph of dependencies between the initial request and the static dependent resources, hosted on the same host compared to the initial call, are discovered. The graphs are then used so that primary requests and indications of their answers are built into the HTTP/2 test, together with the static dependencies, which are resources to be pushed by the HTTP/2 infrastructure when responding to the requests. In this regard, aspects describe creation of intermediate dependency graph(s) based on a semantic analysis of HTTP request content and the sequence of existing HTTP requests of the test, and the use of this graph to aggregate dependencies to root calls so that it is discovered what it to be pushed by the server in responding to primary requests.

Figure 7:
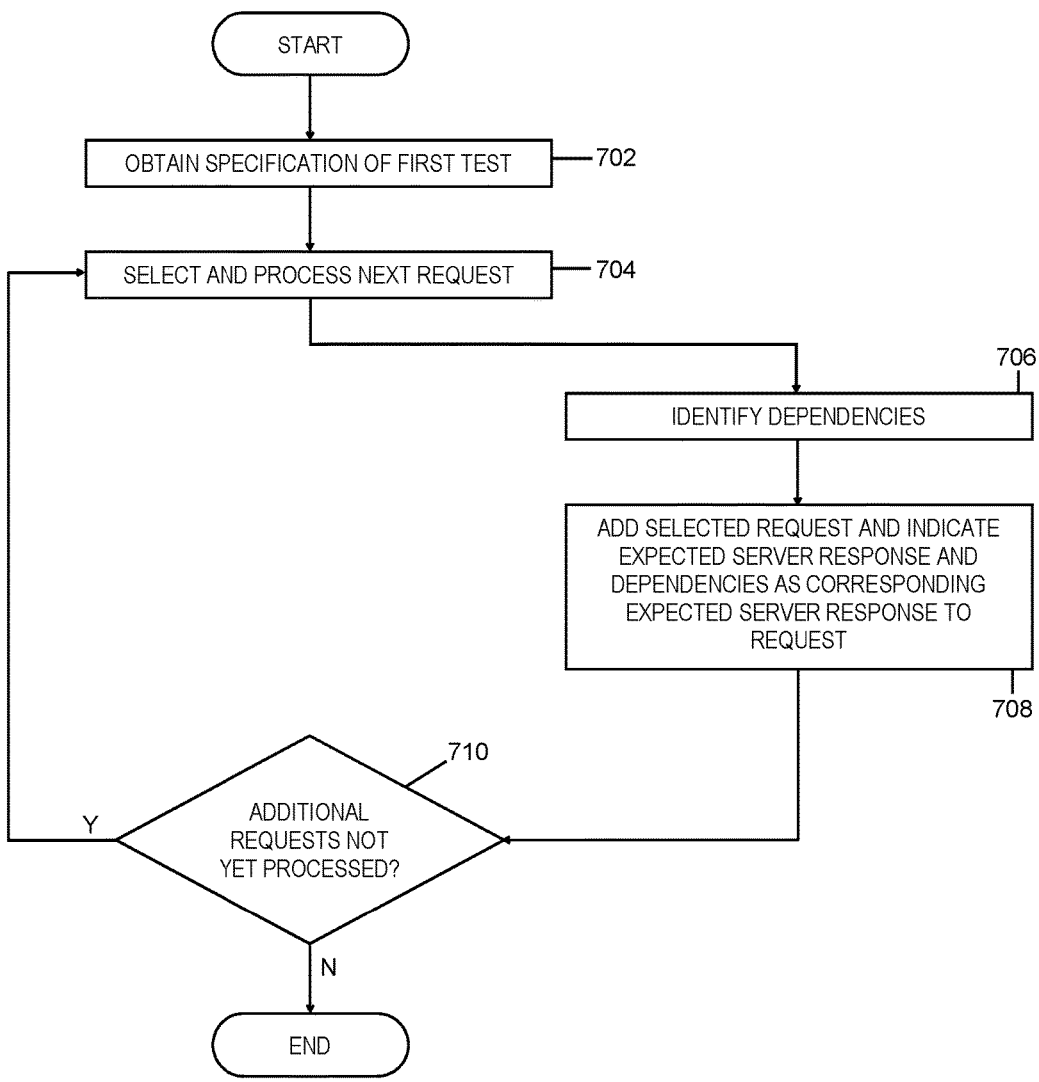
FIG. 7 depicts an example process for building a test for testing server operation, in accordance with aspects described herein.

Accordingly, FIG. 7 depicts an example process for building a test for testing server operation, in accordance with aspects described herein. In some examples, the process is performed one or more computer systems, such as those described herein, which may include one or more test clients and/or one of more other computer systems responsible for building tests and deploying them to test clients, as examples.

The process obtains a specification of a first test (702). The specification of the first test includes a set of requests for testing server operation according to a first protocol. The process then proceeds with the building of a specification of a second test. The specification of the second test includes requests and corresponding expected server responses for testing server operation according to a second protocol. In particular examples, the first protocol is or includes a first web transfer protocol and the second protocol is or includes a second web transfer protocol. Even more particularly, the first web transfer protocol may be Hypertext Transfer Protocol 1.1 (HTTP/1.1), where server operation according to the first protocol is operation according to HTTP/1.1, and/or the second web transfer protocol may be Hypertext Transfer Protocol 2.0 (HTTP/2), where server operation according to the second protocol is operation according to HTTP/2.

The building of the specification of the second test proceeds by, referring back to FIG. 7, selecting and processing a request of the set of requests of the first test (704). The selected request is a next request, of those of the first test, to process. As seen subsequently in the process of FIG. 7, this selection and processing will iterate through any additional next requests, as needed, to process them.

Processing the selected request includes identifying, based on an expected response in response to the selected request, dependencies of the expected response (706). The expected response is one that the server is expected to respond with, and this is generally a given/known when building a test.

The dependencies are resources indicated by the expected response or dependencies of those resources, that are requested in one or more related additional requests of the set of requests of the first test. An example process for identifying the dependencies is depicted and described with reference to FIG. 8.

The process adds to the specification of the second test the selected request, and indicates the expected response and the identified dependences as being a corresponding expected server response, in response to the selected request, from a server operating according to the second protocol (708). Thus, for the root or primary request selected in 704, the specification of the second test will indicate the server response expected to be returned in response to that request (e.g. the resource requested by that primary request), as well as the identified dependencies, and this will be indicated as being the corresponding server response that we can expect from the server operating according to the second protocol. The corresponding expected server response will include not only the answer to the request but a push of the static dependencies of that answer.

The process of FIG. 7 continues by determining whether there are any additional requests in the test that have not yet been processed (710). The requests to be processed by 704 are the ones that are not a call to obtain a dependency in response to another request. If there is a next request to process (710, Y), the process returns to 704 to select and process that request. Thus, the repetition of the selecting from 704 will exclude from the selecting any request, of the set of requests of the first test, that has already been selected and processed, and any of the related additional request(s), i.e. any retrieve a dependency.

The iterating repeats, for each next request of one or more next requests of the set of requests of the first test, the selecting and processing, wherein the repeating adds each next request to the specification of the second test and indicates the respective expected response to the next request and identified dependencies as a corresponding expected server response in response to the next request from the server operating according to the second protocol. Thus, for each root or primary request selected in 704, the specification of the second test will indicate the server response expected to be returned in response to the primary request (e.g. the resource requested by that primary request), as well as the identified dependencies, and these will be indicated as being the corresponding expected server responses that we can expect from the server operating according to the second protocol.

If there are no additional requests that have not yet been processed (710, N), then in this example the process ends. It is noted, however, that in some examples the iterating above does not actually generate or write the second test but instead stores or caches the necessary information about primary requests, dependencies, expected responses, etc. until the iterating completes. In this case, the information can then be used in generating, writing, outputting, etc. the second test. This presents another option for generating the test as opposed to generating it on the fly during the iterating of FIG. 7 (e.g. 704-708) as shown.

In any case, the building of the specification of the second test can generate a sequence of primary requests (those selected and processed by 704) and expected responses to the primary requests, and, for each primary request, a list of sub-resources that are expected to be pushed to a requesting client from the server operating according to the second protocol.

Figure 8:
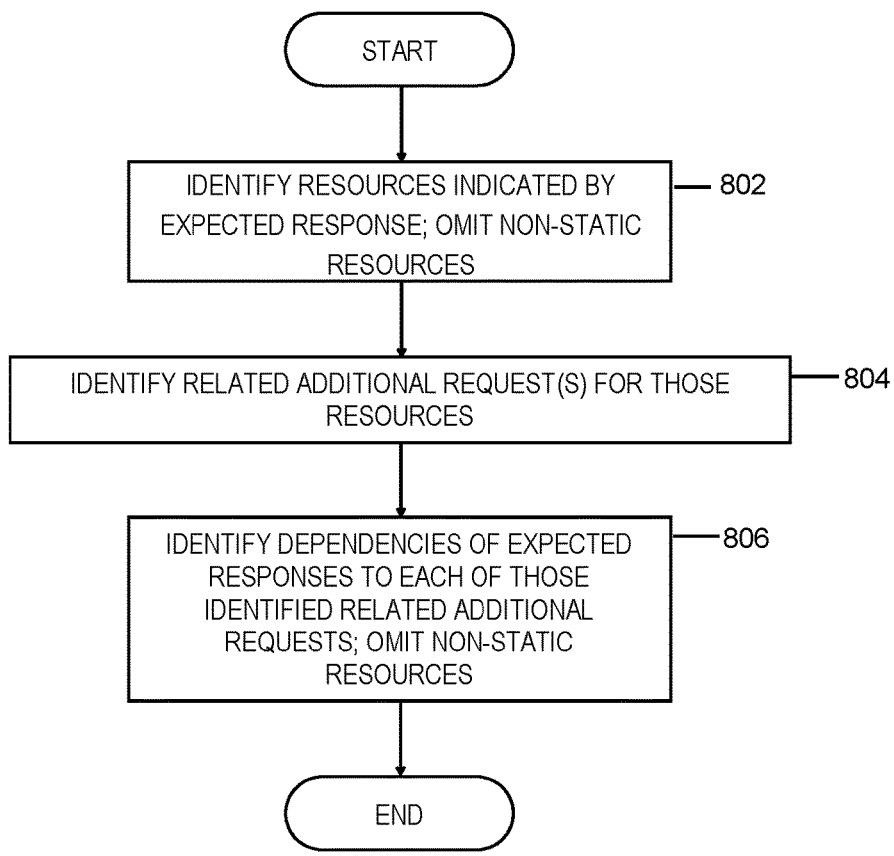
FIG. 8 depicts an example process for identifying dependencies, in accordance with aspects described herein.

FIG. 8 depicts an example process for identifying dependencies, in accordance with aspects described herein. The dependencies of a response to a request are the resources indicated in the response, as well as any dependencies of those resources, i.e. dependencies indicated by those resources, which are delivered as responses to other requests. Those other requests are considered to be the additional requests related to the initial request. The requests indicated by 206 of FIG. 3 are related additional requests because they are requests to obtain resources indicated by the expected response to the initial request 204.

Thus, the process to identify the dependencies of an expected response identifies the resources indicated by the expected response (802) as being at least some of the dependencies, optionally omitting non-static resources in some examples, if desired. In some examples, identification of the resources identified by the expected response analyzes the expected response to identify known resource types, for instance image files (.ico, .png, etc.), style sheets, javascript files, as examples.

The process of FIG. 8 then identifies (804), from the set of requests of the first test, related additional request(s) for those resources identified by 802. In a case where the specification of the first test includes a collection of uniform resource identifiers (URIs), each uniform resource identifier being a request of the set of requests, the process analyzes the expected response to identify the known resource types and performs pattern matching against the collection of URIs to identify the related additional request(s).

The related additional requests are each themselves associated with an expected response from the server for a resource that might have dependencies. Thus, the identification of dependencies will proceed iteratively for each of those requests, so that the process identifies dependencies of expected responses to each of those identified related additional requests (806), optionally omitting non-static resources if desired. After this completes, the set of dependencies of the primary request have been identified, as have any related requests of the test to request those dependencies.

Although various examples are provided, variations are possible without departing from a spirit of the claimed aspects.

Figure 9:
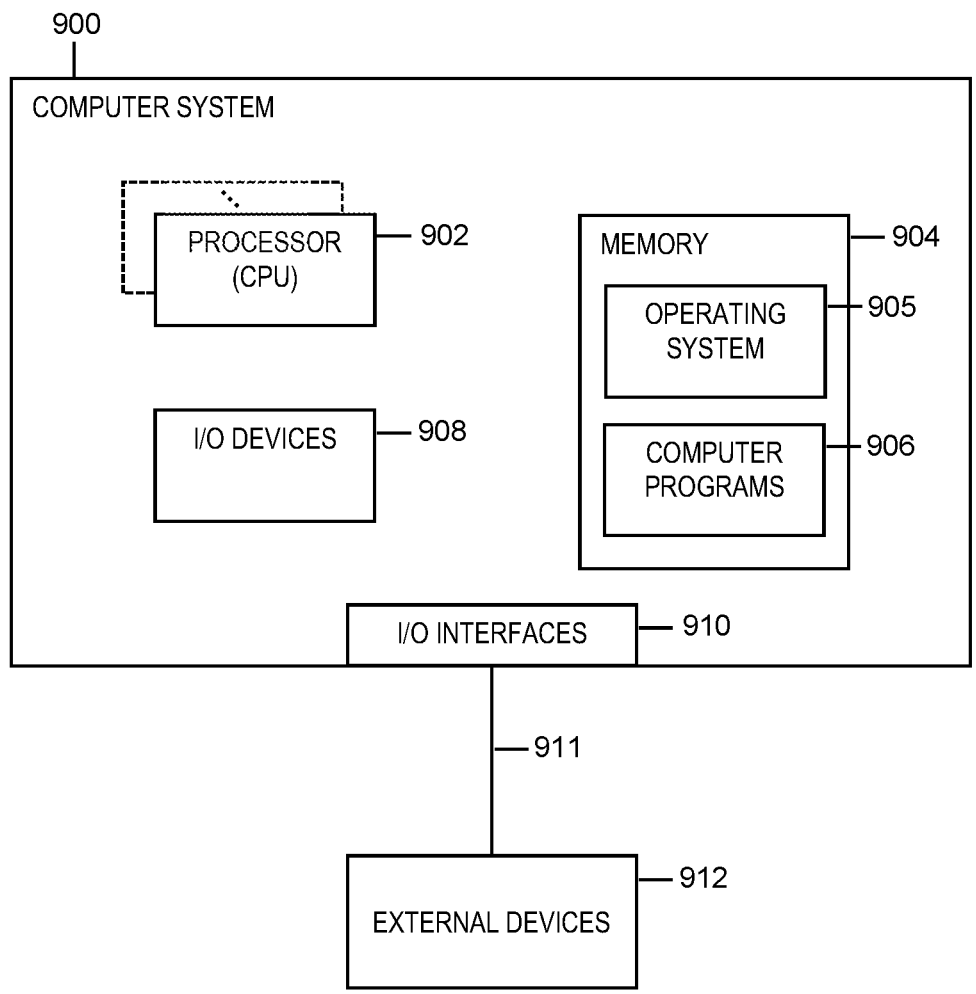
FIG. 9 depicts one example of a computer system and associated devices to incorporate and/or use aspects described herein.

Processes described herein may be performed singly or collectively by one or more computer systems. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g. Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically, programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. Computer system 900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 10.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 10:
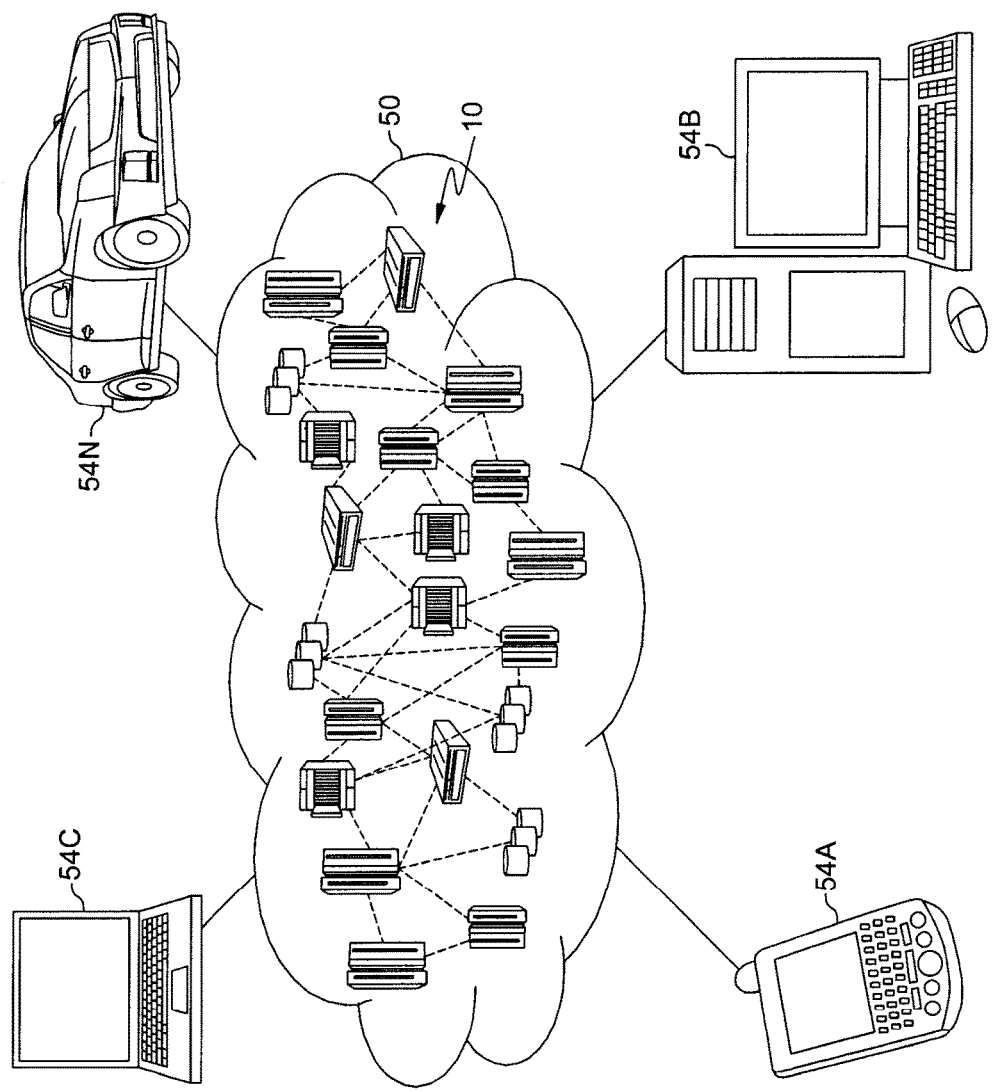
FIG. 10 depicts a cloud computing environment according to an embodiment of the present invention.

Referring now to FIG. 10, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
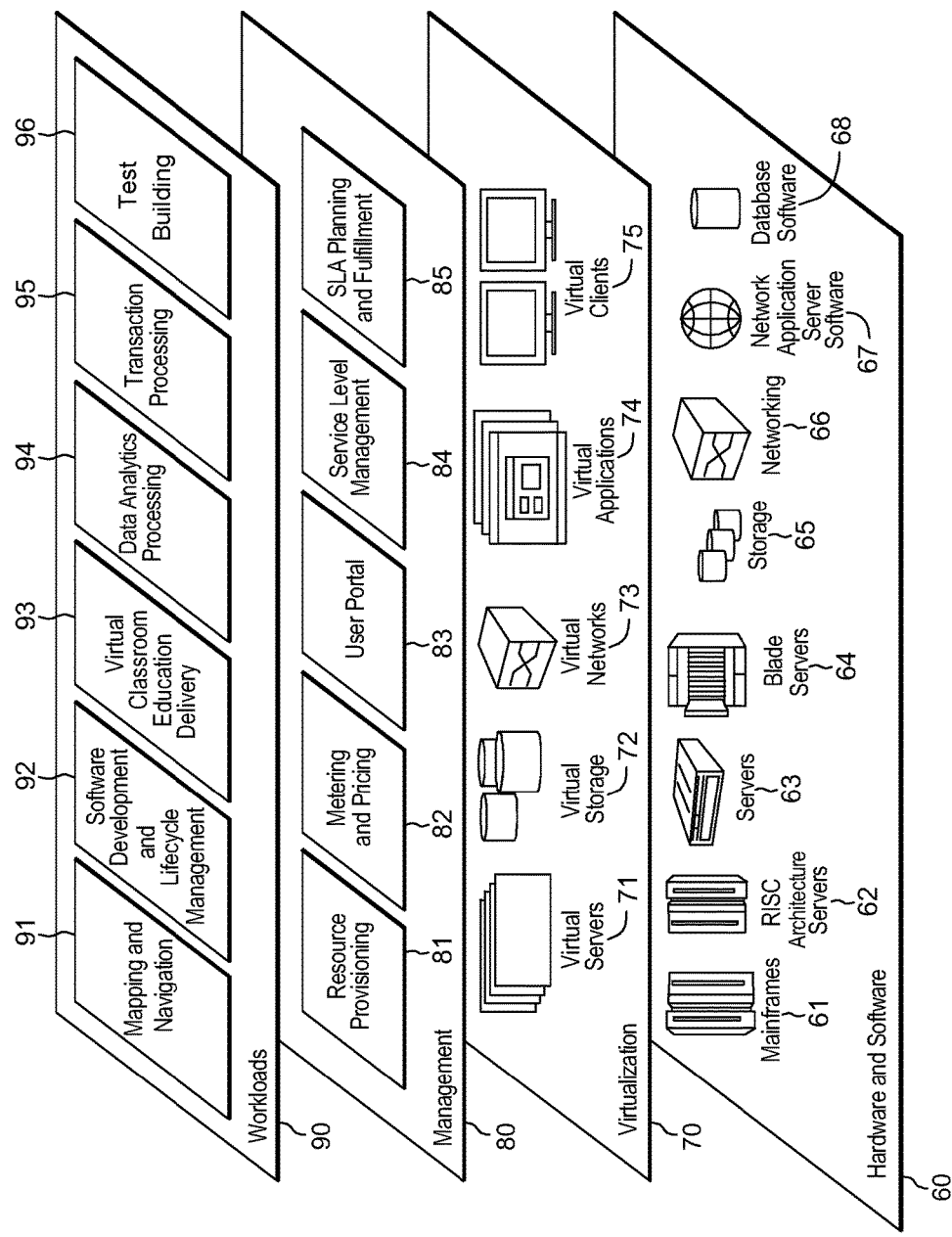
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test building 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining a specification of a first test, the specification of the first test comprising a set of requests for testing server operation according to a first protocol, in which server operation according to the first protocol returns a set of resources in response to receipt of the set of requests of the first test; and
   building a specification of a second test, the specification of the second test comprising requests and corresponding expected server responses for testing server operation according to a second protocol, in which server operation according to the second protocol returns the set of resources in response to receipt of the requests of the second test, the building comprising:
      selecting and processing a request of the set of requests of the first test, the processing the selected request comprising:
         identifying, based on an expected response in response to the selected request, dependencies of the expected response, the dependencies being resources indicated by the expected response or dependencies of those resources, that are requested in one or more related additional requests of the set of requests of the first test; and
         adding, to the specification of the second test, the selected request, and indicating the expected response and the identified dependences as being a corresponding expected server response, in response to the selected request, from a server operating according to the second protocol, such that the corresponding expected server response to receipt of the selected request by the server operating according to the second protocol comprises the expected response and the identified dependencies, and inclusion of the one or more related additional requests of the set of requests of the specification of the first test into the specification of the second test is thereby avoided.

2. The method of claim 1, further comprising repeating, for each next request of one or more next requests of the set of requests of the first test, the selecting and processing, wherein the repeating adds each next request to the specification of the second test and indicates the respective expected response to the next request and identified dependencies as a corresponding expected server response in response to the next request from the server operating according to the second protocol.

3. The method of claim 2, wherein repeating the selecting excludes from the selecting any request, of the set of requests of the first test, that has already been selected and processed, and any related additional request.

4. The method of claim 1, wherein the identifying the dependencies of the expected response comprises:
   identifying the resources indicated in the expected response as being at least some of the dependencies;

identifying the one or more related additional requests; and iteratively repeating the identifying the dependencies for each expected response to the one or more related additional requests.

5. The method of claim 1, wherein the dependencies comprise static resources, and the identifying the dependencies omits any non-static resources from the identified dependencies of the expected response.

6. The method of claim 1, wherein building the specification of the second test generates a sequence of primary requests and expected responses to the primary requests, and, for each primary request, a list of sub-resources that are expected to be pushed to a requesting client from the server operating according to the second protocol.

7. The method of claim 1, wherein the specification of the first test comprises a collection of uniform resource identifiers, each uniform resource identifier being a request of the set of requests, and wherein the identifying comprises analyzing the expected response to identify known resource types and performing pattern matching against the collection of uniform resources identifiers to identify the one or more related additional requests.

8. The method of claim 1, wherein the first protocol comprises a first web transfer protocol and the second protocol comprises a second web transfer protocol.

9. The method of claim 8, wherein the first web transfer protocol is Hypertext Transfer Protocol 1.1 (HTTP/1.1), wherein server operation according to the first protocol is operation according to HTTP/1.1, and wherein the second web transfer protocol is Hypertext Transfer Protocol 2.0 (HTTP/2), wherein server operation according to the second protocol is operation according to HTTP/2.

10. A computer system comprising:
a memory; and
a processor in communication with the memory, wherein the computer system is configured to perform a method comprising:
obtaining a specification of a first test, the specification of the first test comprising a set of requests for testing server operation according to a first protocol, in which server operation according to the first protocol returns a set of resources in response to receipt of the set of requests of the first test; and
building a specification of a second test, the specification of the second test comprising requests and corresponding expected server responses for testing server operation according to a second protocol, in which server operation according to the second protocol returns the set of resources in response to receipt of the requests of the second test, the building comprising:
selecting and processing a request of the set of requests of the first test, the processing the selected request comprising:
identifying, based on an expected response in response to the selected request, dependencies of the expected response, the dependencies being resources indicated by the expected response or dependencies of those resources, that are requested in one or more related additional requests of the set of requests of the first test; and
adding, to the specification of the second test, the selected request, and indicating the expected response and the identified dependences as being a corresponding expected server response, in response to the selected request, from a server operating according to the second protocol, such that the corresponding expected server response to receipt of the selected request by the server operating according to the second protocol comprises the expected response and the identified dependencies, and inclusion of the one or more related additional requests of the set of requests of the specification of the first test into the specification of the second test is thereby avoided.

11. The computer system of claim 10, wherein the method further comprises repeating, for each next request of one or more next requests of the set of requests of the first test, the selecting and processing, wherein the repeating adds each next request to the specification of the second test and indicates the respective expected response to the next request and identified dependencies as a corresponding expected server response in response to the next request from the server operating according to the second protocol.

12. The computer system of claim 11, wherein repeating the selecting excludes from the selecting any request, of the set of requests of the first test, that has already been selected and processed, and any related additional request.

13. The computer system of claim 10, wherein the identifying the dependencies of the expected response comprises:
identifying the resources indicated in the expected response as being at least some of the dependencies;
identifying the one or more related additional requests; and
iteratively repeating the identifying the dependencies for each expected response to the one or more related additional requests.

14. The computer system of claim 10, wherein the dependencies comprise static resources, and the identifying the dependencies omits any non-static resources from the identified dependencies of the expected response.

15. The computer system of claim 10, wherein the specification of the first test comprises a collection of uniform resource identifiers, each uniform resource identifier being a request of the set of requests, and wherein the identifying comprises analyzing the expected response to identify known resource types and performing pattern matching against the collection of uniform resources identifiers to identify the one or more related additional requests.

16. The computer system of claim 10, wherein the first protocol is Hypertext Transfer Protocol 1.1 (HTTP/1.1), wherein server operation according to the first protocol is operation according to HTTP/1.1, and the second protocol is Hypertext Transfer Protocol 2.0 (HTTP/2), wherein server operation according to the second protocol is operation according to HTTP/2.

17. A computer program product comprising:
a computer readable storage medium readable by a processor and storing instructions for execution by the processor for performing a method comprising:
obtaining a specification of a first test, the specification of the first test comprising a set of requests for testing server operation according to a first protocol, in which server operation according to the first protocol returns a set of resources in response to receipt of the set of requests of the first test; and
building a specification of a second test, the specification of the second test comprising requests and corresponding expected server responses for testing server operation according to a second protocol, in which server operation according to the second protocol returns the set of resources in response to receipt of the requests of the second test, the building comprising:
  selecting and processing a request of the set of requests of the first test, the processing the selected request comprising:
    identifying, based on an expected response in response to the selected request, dependencies of the expected response, the dependencies being resources indicated by the expected response or dependencies of those resources, that are requested in one or more related additional requests of the set of requests of the first test; and
    adding, to the specification of the second test, the selected request, and indicating the expected response and the identified dependences as being a corresponding expected server response, in response to the selected request, from a server operating according to the second protocol, such that the corresponding expected server response to receipt of the selected request by the server operating according to the second protocol comprises the expected response and the identified dependencies, and inclusion of the one or more related additional requests of the set of requests of the specification of the first test into the specification of the second test is thereby avoided.

18. The computer program product of claim 17, wherein the method further comprises repeating, for each next request of one or more next requests of the set of requests of the first test, the selecting and processing, wherein the repeating adds each next request to the specification of the second test and indicates the respective expected response to the next request and identified dependencies as a corresponding expected server response in response to the next request from the server operating according to the second protocol.

19. The computer program product of claim 18, wherein repeating the selecting excludes from the selecting any request, of the set of requests of the first test, that has already been selected and processed, and any related additional request.

20. The computer program product of claim 17, wherein the first protocol is Hypertext Transfer Protocol 1.1 (HTTP/1.1), wherein server operation according to the first protocol is operation according to HTTP/1.1, and the second protocol is Hypertext Transfer Protocol 2.0 (HTTP/2), wherein server operation according to the second protocol is operation according to HTTP/2.

* * * * *